United States Patent [19]
Schultz

[11] 3,946,167
[45] Mar. 23, 1976

[54] HIGH DENSITY RECORDING PLAYBACK ELEMENT CONSTRUCTION

[75] Inventor: Bodo Schultz, Berlin, Germany

[73] Assignee: TED Bildplatten Aktiengesellschaft AEG-Telefunken-Teldec, Zug, Switzerland

[22] Filed: Nov. 19, 1974

[21] Appl. No.: 525,312

[30] Foreign Application Priority Data
Nov. 20, 1973 Germany............................ 7341378

[52] U.S. Cl.. 179/100.41 P; 179/100.41 K; 310/8.2
[51] Int. Cl.² ........................................ H04R 17/04
[58] Field of Search........... 179/100.41 P, 100.41 K, 179/100.41 T; 310/8.2

[56] References Cited
UNITED STATES PATENTS
3,691,318  9/1972  Schuller.................... 179/100.41 P Primary Examiner—Stuart N. Hecker
Attorney, Agent, or Firm—Spencer & Kaye

[57] ABSTRACT

In a pickup for the playback of a high density signal recording stored at the surface of a record carrier, which pickup includes a scanning element and a mechanical-electrical pressure transducer connected to the scanning element by a layer of adhesive, undesired vibrations of structural parts of the pickup during playback are prevented by providing at least that part of the surface of the pickup where the pressure transducer is connected to the scanning element with a layer of a hardened casting mass, which is applied in the liquid state in which it has a viscosity of between 5 and 50 cP at 20°C. Preferably, the remainder of the surface of the pickup is also covered with such a coating, with the exception of the scanning surface of the scanning element.

8 Claims, 2 Drawing Figures

HIGH DENSITY RECORDING PLAYBACK ELEMENT CONSTRUCTION

BACKGROUND OF THE INVENTION

The present invention relates to a pickup for a high density signal recording which is stored by modulating the structure at the surface of a record carrier, particularly for a video record, the pickup including a mechanical-electrical pressure transducer, a scanning, or guide, element fastened to the transducer, a damping element supporting the pressure transducer, and a preferably tubular support fastened to the damping element to serve as a mount for the pickup.

Pickups for the above-mentioned type are presently being used to scan the signal recordings of color television picture recordings with accompanying sound on so-called video records and to convert them to an electrical signal which can be reproduced by a conventional television receiver. With the principle of pressure scanning employed in this case, the deflections of the scanning surface of the pickup, which is in contact with the surface relief of the record carrier, always remain much smaller than the corresponding compressions of the structural elements of this relief in the direction of force. This is accomplished by giving the deflectable pickup part a very high spring hardness together with a very small mass so that the natural resonant frequency lies above the signal frequency range which extends up to 4 or 5 MHz.

Although, accordingly, the main resonance lies above the useful frequency range, extensive practical testing of such pickups has shown that interference with the oscillating characteristics can nevertheless occur.

SUMMARY OF THE INVENTION

It is an object of the present invention to eliminate these interferences.

These and other objects according to the invention are achieved, in a pickup for a high density signal recording including a mechanical-electrical pressure transducer and a scanning element fastened thereto and presenting a scanning surface, by the provision of a coating on that part of the surface of the pickup where the pressure transducer is connected to the scanning element, the coating being constituted by a layer of a hardened casting mass of a material which, in the liquid state, has a viscosity of from 5 to 50 cP.

According to preferred embodiments of the invention, the casting mass has, in the liquid state, a viscosity of between 20 and 50 cP at 20°C and a preferred material for this mass is a cyanacrylate adhesive.

The objects according to the invention are also achieved by a method for producing a pickup of the type defined above which involves wetting at least that part of the surface of the pickup where the pressure transducer and the scanning element are joined together with the casting mass while in its liquid state, in such state the material of the mass having the property of penetrating into any remaining crevices between the scanning element and the pressure transducer, and permitting the mass to harden, after wetting, as a coating layer on that part of the pickup surface.

The prevention of vibrations of structural parts by the present invention results in a smoother frequency response; in particular, high frequency overshooting phenomena are strongly reduced during playback of amplitude jumps and interferences in the sound reproduction are also avoided.

Further advantages are the improvement of the connection of the individual components with one another. Short circuits in the connecting wires of the pressure transducer are dependably avoided in the region enclosed by the coating. Sensitive parts are better protected against extraneous influences, such as drafts, pressure, cold, humidity.

It has surprisingly been found that the main resonant frequency of the transducer system with the appended masses is even increased by the use of the present invention, i.e., for a main resonant frequency of about 5 MHz, an increase of 200 to 500 kHz has been noted.

At the production level, the use of the present invention has resulted in a reduction in the number of rejects. The costs involved in incorporating the invention into the production process are very low. The application of the layer can be effected by immersing the interconnected parts or by spraying on the casting mass or by other suitable means.

The reason for an increase in the main resonance seems to be that, on the one hand, the adhesive or glue which is used to fasten the scanning element to the pressure transducer does not completely fill the groove provided for the adhesive so that voids or crevices remain and the connection of both parts to one another does not always have the sufficient spring hardness, and that, on the other hand, the liquid casting mass fills these remaining voids or crevices in the adhesive groove by capillary action, i.e., capillary ascension, so that after hardening the spring hardness of the connection between pickup element and pressure transducer is increased.

In practice, a casting mass has found acceptance which in the fresh, i.e., still liquid, state has a viscosity of from 20 to 50 cP (centipoise) at 20°C. It is also advantageous for the casting mass to have the characteristic that it shrinks when hardening. The commercially available adhesive sold under the trademark "Sicomet 85" has been found to be very satisfactory as such a casting mass. This is a solvent-free, rapidly polymerizing, cold-hardening, single component adhesive having, in its liquid state at 20°C, a viscosity of 20 cP, its main component being cyanacrylate to which small quantities of film formers and stabilizers have been added. The manufacturer of the adhesive sold under this trademark is the firm Sichel-Werke GmbH, in Hannover, Germany.

It would also be in order to mention that it is not feasible to use such adhesive at the outset for attaching the scanning element to the pressure transducer because the adhesive used as the casting mass hardens too rapidly. The type of adhesive which is used for initially attaching the scanning element to the transducer hardens more slowly than the casting mass. Suitable adhesives for initially attaching of the parts of the pickup one to another are mentioned in the German patent publication (Auslegeschrift) No. 21 64 423.

DESCRIPTION OF THE PREFERRED EMBODIMENTS

Figure 1:
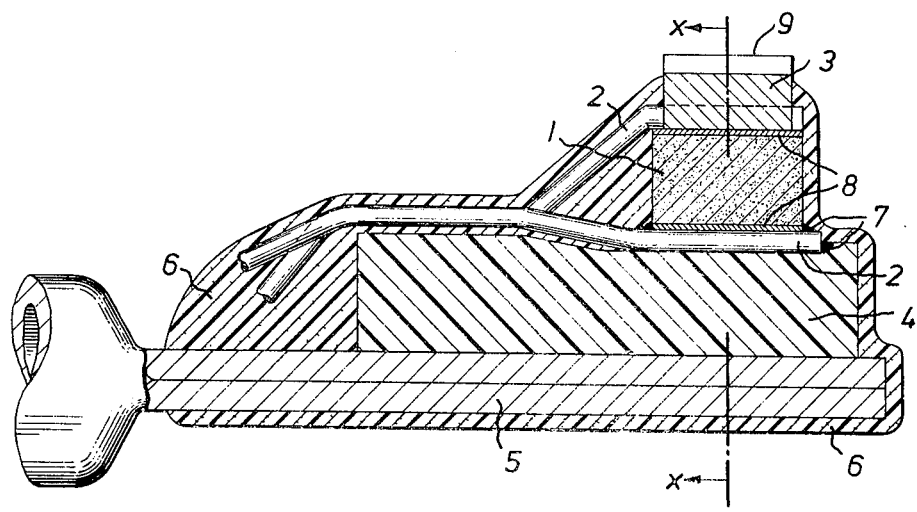
FIG. 1 is a cross-sectional side view along the axis of the tubular support of a pickup formed according to the invention taken along the line y—y of FIG. 2.
Figure 2:
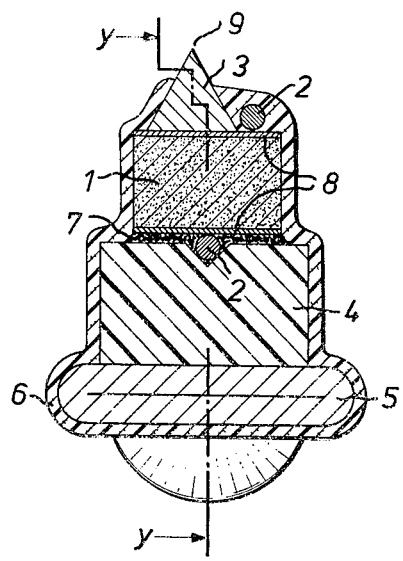
FIG. 2 is a cross-sectional end view, perpendicular to the axis of the tubular support, taken along the line x—x of FIG. 1.

FIGS. 1 and 2 show a pickup for a video record which operates according to the pressure scanning principle and in which the present invention is employed. A mechanical-electrical transducer 1 is constituted by a block-shaped piece of a piezoceramic and serves to convert the pressure pulses obtained during pressure scanning into corresponding electrical signals. Lead wires 2 which are connected to the transducer at contact surfaces 8 serve to connect the transducer with an amplifier, not shown. The transducer 1 is permanently connected to a scanning element 3, for example by means of a layer of adhesive. The scanning element is made of a wear-resistant material, for example a diamond, and is intended to glide with its scanning surface 9 along the signal track formed at the surface of the record carrier.

On the side facing away from the scanning element 3 the transducer 1 is fastened by means of an adhesive layer 7 to a damping element 4 which is made of a material, for example a plastic, which at room temperature has high internal damping. A suitable substance is a fluoroelastomer which is commercially available in Germany under the trademark "Viton" and is produced by E. J. Dupont De Nemours & Co. Inc., Wilmington, Delaware 19898, U.S.A. The damping element 4 is fastened to the flattened part of a tubular support 5 which holds the pickup in its operating position.*)

*) The construction of the pickup may be modified in accordance with said German patent publication No. 21 64 423.

According to the present invention, the structural unit as a whole, which includes the substantial components of the pickup, is coated with a layer 6 of a casting mass which after hardening effects that mechanical resonances in the signal frequency range are damped because the coated parts are rigidly jointed one to another. The damping effect may reach 10 decibels. Excepted from the covering by the casting mass is the region occupied by the scanning surface 9. As noted above, this mass can be constituted by the material sold under the trademark "SICOMET 85." For wetting, the pickup, including the scanning element, the transducer, the damping element, and a part of the support, is dipped in the liquid casting mass of room temperature, i.e., about 20° C. After wetting, the pickup is turned in the position shown in the figures so that the liquid casting mass flows down from the scanning surface of the scanning element. The casting mass then hardens in the same position, the time required to achieve hardening under the conditions of average room temperature being about 5 minutes. After hardening the scanning surface is ground for forming a rounded surface and for grinding off casting mass which remained on this surface.

The thickness of the mass is, on even surfaces, less than 10 $\mu$ thus avoiding a too great increase of the weight of the pickup which increase would reduce the resonance frequency. But at the location of indentations the thickness is greater, for example where the scanning element is attached to the transducer. An indentation is present at that location because the scanning element is narrower than the transducer. At that location, and around the wires the thickness is about some tenth of a millimeter. To provide a better understanding of the relations of the dimensions of the pickup and the hardened casting mass, exemplary dimensions of the pickup are set forth below in order of size: flattened support: breadth at most 0.4 mm; height 0.1 or 0.2 mm; damping element: breadth 250 $\mu$; height 210 $\mu$; length 600 $\mu$; transducer with its electrodes: breadth and length 200 $\mu$; height 150 $\mu$; scanning element: breadth and length 130 $\mu$; height 70 $\mu$; wire: diameter 25 $\mu$ coating mass in liquid state: weight 200 micrograms; volume 0.18 mm$^3$.

Other examples of suitable kinds of casting mass are "LOCTITE 290" or "LOCTITE 601" (trademarks) which are liquid, solvent-free, single component adhesives which are anaerobic, i.e., do not harden in cold state if only air is present, but harden for example in the presence of metals. These adhesives are products of the firm Loctite, Munich 81, Arabellastrabe 5, Germany. Another suitable adhesive of this firm is "JS-Kleber 03" or "JS-Kleber 06" both cyanacrylate adhesives.

All used kinds of casting mass should be at least approximately as hard as the adhesive 7 used for initially attaching together the parts of the pickup, which adhesive 7 may have a diamond pyramid hardness (Vickers-Harte) in the order of 15 or 20 kg(force)/mm$^2$. In addition, the relative dielectric constant should be small, i.e., not much more than 5, in the used frequency range, but the specific resistance should be high, i.e., in the order of $10^9$ m$\Omega$ mm or more.

It will be understood that the above description of the present invention is susceptible to various modifications, changes and adaptations, and the same are intended to be comprehended within the meaning and range of equivalents of the appended claims.

I claim:

1. In a pickup for a high density signal recording including a mechanical-electrical pressure transducer and a scanning element fastened thereto and presenting a scanning surface, the improvement comprising a layer of a hardened casting mass forming a coating on that part of the surface of said pickup where said pressure transducer is connected to said scanning element, said mass being of a material which, in the liquid state prior to becoming hardened, has a viscosity of from 5 to 50 cP.

2. Pickup as defined in claim 1 wherein said casting mass in the liquid state prior to becoming hardened has a viscosity of from 20 to 50 cP at 20°C.

3. Pickup as defined in claim 2 wherein said pressure transducer has output lead wires connected thereto and said pickup constitutes a structural unit which further includes said transducer, said scanning element, part of the lead wires connected to said transducer, a damping element and part of a support fastened to said damping element, and wherein said mass covers said structural unit except for the scanning surface of said scanning element, said layer of casting mass, after hardening, rigidly interconnecting adjacent parts of the pickup and thus producing an internal damping for mechanical vibrations in the frequency range of the recorded signal.

4. Pickup as defined in claim 3 wherein said casting mass is of a material which shrinks when hardening.

5. Pickup as defined in claim 1 further comprising a layer of adhesive joining said scanning element to said transducer and wherein said casting mass is of a material which, in the liquid state, has wetting properties relative to said scanning element, said pressure transducer and said layer of adhesive, such that capillary ascension occurs when any remaining crevices in said pickup are wetted.

6. Pickup as defined in claim 5 wherein said casting mass is constituted by a cyanacrylate adhesive.

7. Method for producing a pickup as defined in claim 1 comprising wetting at least that part of the surface of said pickup where the pressure transducer and the scanning element are joined together with a casting mass in its liquid state, the mass being of a material which, in its liquid state, has a viscosity of from 5 to 50 cP and has the property of penetrating into any remaining crevices between the scanning element and the pressure transducer, and permitting the mass to harden, after wetting, as a coating layer on such part of the pickup surface.

8. Method as defined in claim 7 wherein the casting mass is constituted by a cyanacrylate adhesive.

* * * * *